Aug. 16, 1927.
A. L. PUTNAM
1,639,109
METHOD OF WELDING METAL SPOKES
Filed Oct. 2, 1926
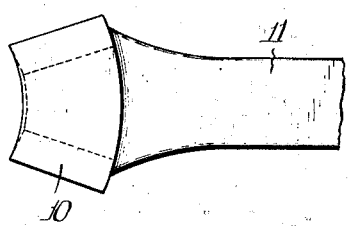
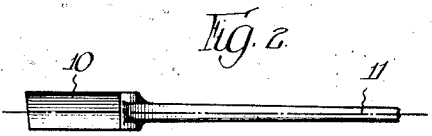
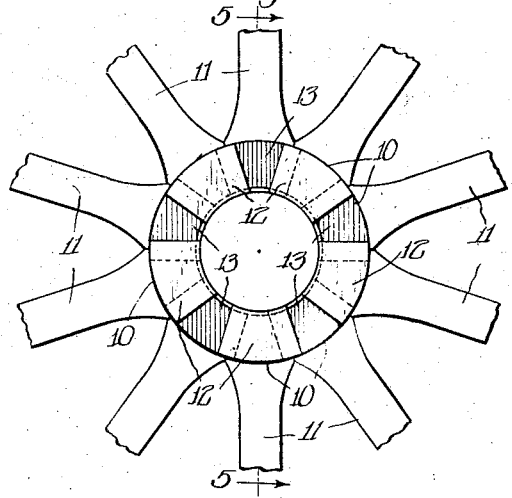
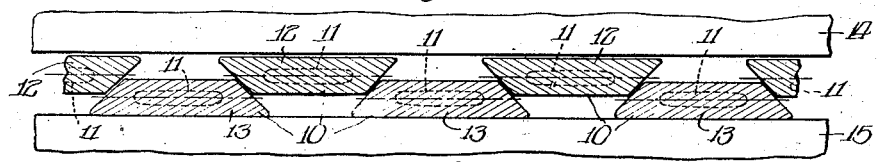
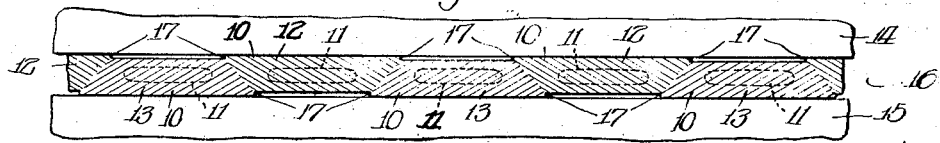
Witness:
R. Burkhardt.
Inventor:
Alden L. Putnam,
By Cromwell, Greist-Warden
Attys.

Patented Aug. 16, 1927.

1,639,109

UNITED STATES PATENT OFFICE.

ALDEN L. PUTNAM, OF DEARBORN, MICHIGAN, ASSIGNOR, BY MESNE ASSIGNMENTS, TO STEEL WHEEL CORPORATION, OF LANSING, MICHIGAN, A CORPORATION OF MICHIGAN.

METHOD OF WELDING METAL SPOKES.

Application filed October 2, 1926. Serial No. 139,142.

The present invention has to do with vehicle wheels of the metal spoke type, and is particularly concerned with the manufacturing processes involved in welding the separate spokes of a wheel together at their inner ends, to form the so-called spoke spider of the wheel.

It has been suggested that the spokes in such a wheel be provided at their inner ends with heads which are tapered and have oppositely bevelled side edges, which shaping permits the spokes to be assembled for welding with the heads in an unbroken circle and with alternate heads wedged into the spider from one side thereof and intervening heads wedged from the other.

In attempting, however, to butt-weld the assembled heads together between two flat welding electrodes, it has been found difficult, if not impossible, to force the heads into positions flush with each other and at the same time obtain satisfactory welds therebetween, owing to the fact that when the heads become flush, or nearly so, no spaces are left open for the weld flashes to go, and the welding operation therefore cannot be continued long enough to permit the heads to be brought into positions flush with each other. As a result, the spokes in the welded spider will be more or less staggered, with alternate spokes in one plane and intervening spokes in another.

This condition can be remedied to a certain extent by grooving the electrodes at points in register with the meeting edges of the heads, but the grooves will enlarge rapidly in service, and the electrodes when thus worn will tend to deform the heads. Furthermore, the cost of such special electrodes is considerably more than that of ordinary flat electrodes.

The object of the invention is to provide an improved method of constructing and welding the spokes, whereby the spokes when welded to form the spider will all radiate in the same plane instead of radiating some in one plane and some in another, and ordinary flat electrodes may be used in performing the welding operation.

While the foregoing statement is indicative in a general way of the nature of the invention, other objects and advantages will be evident to those skilled in the art upon a full understanding of the same.

A method which embodies one form of the invention is presented here for the purpose of exemplification, but it will be appreciated that such method may be modified in various unessential respects without departing from the spirit of the invention as defined in the claims.

In the accompanying drawing—

Fig. 1 is a face view of a spoke which has been shaped in accordance with the requirements of the invention;

Fig. 2 is an edge view of the same;

Fig. 3 is an end view of the same;

Fig. 4 is a face view of a spoke spider which has been formed up from a number of the spokes;

Fig. 5 is a section through the spider taken on the line 5—5 of Fig. 4;

Fig. 6 is a projected circular section through the heads of the spokes when in position between the electrodes before the welding operation; and Fig. 7 is a section similar to Fig. 6, showing the spokes and electrodes upon completion of the welding operation.

The invention consists in making the tapered and bevelled heads 10 of the spokes slightly offset from the spoke shanks 11, as shown in Figs. 1 to 3 inclusive, instead of symmetrical therewith; arranging the spokes together in the usual manner for welding but with the heads of alternate spokes 12 offset from their shanks in one direction and the heads of intervening spokes 13 offset from their shanks in the opposite direction, as shown in Fig. 6; and welding the assembled spokes between two electrodes 14 and 15 whereby to bring the shanks of the spokes into a common plane under the pressure of the electrodes without bringing the heads of the spokes into fully flush relation to each other.

Throughout the welding operation, the heads of alternate spokes are only in contact with one electrode while the heads of intervening spokes are only in contact with the other electrode.

By means of the construction and procedure above described, the shanks 11 of the spokes will all be brought readily into the same median plane 16, as shown in Fig. 5 and, at the same time, spaces will be left at the meeting edges 17 of the heads 10 to accommodate the necessary flashes from the welds.

After the welding operation has been completed, the then essentially uneven faces of the spider formed by the faces of the welded heads 10 of the spokes may be machined to eliminate the portions of the heads 10 which project beyond the desired faces of the spider.

I claim:

1. The method of producing a spider from separate metal spokes, which consists in forming the spokes with the heads thereof slightly offset from the shanks, assembling the spokes into a spider with the heads of alternate spokes offset in one direction and the heads of intervening spokes offset in the opposite direction, and welding the assembled spokes together in such a way as to leave the heads in different planes.

2. The method of producing a spider from separate metal spokes, which consists in forming the spokes with the heads thereof slightly offset from the shanks, assembling the spokes into a spider with the heads of alternate spokes offset in one direction and the heads of intervening spokes offset in the opposite direction, and welding the assembled spokes together in such a way as to leave the shanks in a common plane and the heads in different planes.

3. The method of producing a spider from separate metal spokes, which consists in forming the spokes with the heads thereof slightly offset from the shanks, assembling the spokes into a spider with the heads of alternate spokes offset in one direction and the heads of intervening spokes offset in the opposite direction, welding the assembled spokes together in such a way as to leave the shanks in a common plane and the heads in different planes, and machining the faces of the resulting spider to make the heads of the spokes flush with each other.

4. The method of producing a spider from separate metal spokes, which consists in forming the spokes with the heads thereof slightly offset from the shanks and with the side edges of the heads oppositely bevelled, assembling the spokes into a spider in oppositely wedged relation to each other with the heads of alternate spokes offset in one direction and the heads of intervening spokes offset in the opposite direction, welding the side edges of the heads together between two flat circular electrodes in such a way as to leave the shanks in a common plane and the heads in different planes, and machining the faces of the resulting spider to make the heads of the spokes flush with each other.

5. The method of producing a spider from separate metal spokes, which consists in forming the spokes with the side edges of the heads thereof oppositely bevelled, assembling the spokes into a spider with the bevelled heads in complementary and wedging relation to each other and with the faces of adjoining heads offset, and welding between pressure electrodes in such a way as to leave the faces of adjoining heads offset to a less extent upon completion of the welding operation.

In testimony whereof I have hereunto subscribed my name.

ALDEN L. PUTNAM.